United States Patent [19]

Yano et al.

[11] Patent Number: 5,702,512
[45] Date of Patent: Dec. 30, 1997

[54] OIL INK COMPOSITION

[75] Inventors: Masanao Yano, Yorii-machi; Takeshi Yadoiwa, Kamisadori-machi; Chie Yanase, Kaizawa-machi, all of Japan

[73] Assignee: Mitsubishi Pencil Co., Ltd., Tokyo, Japan

[21] Appl. No.: 607,317

[22] Filed: Feb. 26, 1996

[30] Foreign Application Priority Data

Feb. 28, 1995 [JP] Japan .................. 7-040041

[51] Int. Cl.$^6$ .................. C09D 11/02
[52] U.S. Cl. .................. 106/31.75; 106/31.86; 106/31.88; 106/31.9
[58] Field of Search .................. 106/20 R, 23 H, 106/30 R, 32, 31.75, 31.86, 31.88, 31.9, 31.6

[56] References Cited

U.S. PATENT DOCUMENTS

| | | | |
|---|---|---|---|
| 4,407,882 | 10/1983 | Hauser et al. | 106/22 H |
| 4,605,441 | 8/1986 | Masuda et al. | 106/30 R |
| 4,762,568 | 8/1988 | Nakamura et al. | 106/432 |

FOREIGN PATENT DOCUMENTS

| | | |
|---|---|---|
| 275369 | 12/1986 | Japan . |
| 3-2279 | 1/1991 | Japan . |
| 6-4802 | 2/1994 | Japan . |
| 6-313140 | 11/1994 | Japan . |

*Primary Examiner*—Helene Klemanski
*Attorney, Agent, or Firm*—Armstrong, Westerman, Hattori, McLeland & Naughton

[57] ABSTRACT

Oil ink composition of the present invention having titanium dioxide as pigment, resin and organic solvent contains a compound (A) which has at least one amide group (—CONH—) or amino group (—N<) and a compound (B) selected from phosphoric acid and phosphate compound. The oil ink composition is suitably used for a writing instrument such as a ball-point pen.

8 Claims, No Drawings

OIL INK COMPOSITION

BACKGROUND OF THE INVENTION

1. Field of the Invention

The present invention relates to oil ink composition, and more particularly to an oil ink composition for which re-dispersibility of pigment is improved to an use it for writing instruments.

2. Description of Related Art

Oil ink which is obtained by dispersing pigment such as titanium dioxide or the like into organic solvent has various advantages, for example, it is excellent in water-proof property, sticking tendency and dryness, and also it is writable (paintable) on any writing medium. Therefore, it has been hitherto used as ink for writing instruments such as a ball-point pen, etc. A writing instrument generally comprises a main body serving as an ink reservoir, and a pen head. When the oil ink is used as ink for a writing instrument such as a ball-point pen or the like, the oil ink is used in such a state that it is filled in the ink reservoir. After the oil ink is filled in the ink reservoir, the pigment of the oil ink is shortly precipitated in the ink reservoir, so that it forms a sedimentary layer in the ink reservoir. Therefore, the ink is stirred and uniformly mixed by using a ball which is built in the ink reservoir. However, when the writing instrument is left for a long time, the ball is embedded in the sedimentary layer, and a stirring power of the ball is reduced. Further, when the precipitate is hardened and consolidated in this state, the ball is fixed in the sedimentary layer, and thus it is impossible to stir the ink, so that the writing instrument cannot be used stably.

Various proposals have been made to overcome the above problem. For example, Japanese Examined Patent Application (Kokoku) No. Hei-6-4802 proposes a method of using titanium dioxide which is subjected to a surface treatment using silane coupling agent and/or titanate coupling agent and adding surfactant of phosphoric ester group. Further, Japanese Laid-open Patent Application No. Hei-3-2279 proposes a method of using titanium dioxide and spherical silica in combination, and Japanese Laid-open Patent Application No. Hei-6-313140 proposes a method of titanium dioxide, and fine powdery silica or fine powdery magnesium carbonate in combination. However, the above methods have not been able to produce such ink composition which can sufficiently solve the above problem.

SUMMARY OF THE INVENTION

In order to solve the problem on the conventional oil ink composition containing pigment as described above, the inventors have had earnest studies and consideration on this matter, and finally they have found that re-dispersibility of precipitated pigment can be improved by adding specific components in combination to ink composition which is formed of titanium dioxide serving as pigment, resin and organic solvent. On the basis of this knowledge, the inventors have achieved the ink composition according to the present invention.

That is, an object of the present invention is to provide an oil ink composition which is improved in re-dispersibility of precipitated pigment and is suitably usable as ink for writing instruments.

Another object of the present invention is to provide an oil ink composition which has excellent dispersibility and which forms little hard precipitate even when it is preserved for a long time.

In order to solve the above objects, according to the present invention, an oil ink composition having titanium dioxide serving as pigment, resin and organic solvent, contains a compound (A) having at least one amide group or amino group, and a compound (B) selected from phosphoric acid and phosphate compound. In the oil ink of the present invention, aggregation of the pigment can be prevented by mixing the compound (A) and the compound (B) into the ink. Accordingly, the ink can be easily stirred by a ball, it has excellent re-dispersibility, and it is hardly precipitated even for long-term preservation, and this ink makes it easy to manufacture the writing instrument which can supply stable line.

DETAILED DESCRIPTION OF PREFERRED EMBODIMENTS

Preferred embodiments according to the present invention will be described hereunder.

The compound (A) of the present invention is required to contain at least one amide group or amino group in its molecule, and no other limitation is imposed on the compound (A). Specifically, the compound (A) of the present invention may be selected from the group consisting of stearamide, stearylamine, dilaurylamine, N,N-dimethylstearylamine, dibenzylamine, N-(N,N-diethylamino)ethyloleamide, N,N-dimethylaminostearylamide, xylylene diamine,N-(N,N-diethylamino)propyloleamide, lauryl polyethylene polyamide, stearyl polyethylene polyamide, etc. These materials may be used solely or in combination of two or more materials. The compound (A) of the present invention may be added at a rate of 0.05 to 15 weight %, preferably at 0.1 to 10 weight % of the total weight of the ink composition. No effect would be obtained if the addition rate is less than 0.05 weight %. On the other hand, if the addition rate is more than 15 weight %, the viscosity of the ink is excessively high, so that lines which are drawn with a writing instrument are scratchy.

Further, the compound (B) of the present invention is required to be formed of phosphoric acid or phosphate compound, and no other limitation is imposed on the compound (B). Specifically, the compound (B) may be selected from the group consisting of phosphoric acid, pyrophosphoric acid, metaphosphoric acid, polyphosphoric acid, lauryl phosphate, polyoxylpropylene oleyl ether phosphate, polyoxylethylene(4) lauryl ether phosphate, dipolyoxyethylene nonylphenyl ether phosphate, etc. These materials may be used solely or in combination of two or more materials. The compound (B) of the present invention may be added at a rate of 0.05 to 15 weight %, preferably at 0.1 to 10 weight % of the total weight of the ink composition. No effect would be obtained if the addition rate is less than 0.05 weight %. On the other hand, if the addition rate is more than 15 weight %, the viscosity of the ink is excessively high, so that lines which are drawn with a writing instrument are scratchy.

No limitation is imposed on the kind and the addition amount of titanium dioxide used in the present invention. In a general ink composition, titanium dioxide is added at a rate of 1 to 60 weight % of the total amount of the ink composition.

The organic solvent of the present invention may be selected from the group consisting of alcohols solvent, hydrocarbons solvent, glycol ethers solvent, aromatic solvent, ketones solvent, ester solvent, etc. These materials may be used solely or in combination of two or more materials. The organic solvent is preferably added at a rate of 5 to 90 weight % of the total amount of the ink composition. Specifically, it may be selected from the group consisting of isobutyl alcohol, ethanol, isopropyl alcohol, methyl cyclohexane, toluene, xylene, dipropylene glycol, diproplylene glycol monomethyl ether, polypropylene glycol, acetone, methyl isobutyl ketone, methyl ethyl ketone, ethyl acetate, propyl acetate, etc.

The resin used in the present invention is required to be soluble in the solvent, and the other limitation is imposed on the resin. Specifically, the resin used in the invention may be selected from the group consisting of gum rosin, maleic resin, alkyd resin, phenol resin, ketone resin, terpene resin, acrylic resin, aromatic hydrocarbons resin, etc. These materials may be used solely or in combination of plural materials. The resin is preferably added at a rate of 1 to 50 weight % of the total amount of the ink composition. Specifically, the following resins may be used: "TESKYD MRG" (produced by Tokushima Seiyu Co., Ltd.) as maleic resin, "HITANOLE 2400" (produced by Hitachi Chemical Co., Ltd.) as phenol resin, "ACRYDIC A-450" (produced by Dainippon Ink & Chemicals, Inc.) as acrylic resin, "BECKOSOL" or "SOLID BECKOSOL No.18"" (produced by Dainippon Ink & Chemicals, Inc.) as alkyd resin, "MALKYD No.6" (produced by Arakawa Chemicals Industries, Co., Ltd.) as maleic resin, "ESTER GUM" (produced by Arakawa Chemicals Industries, Co., Ltd.), "YS POLYSTAR S-145" (produced by Yasuhara Yushi Kogyo Co., Ltd.) as gum rosin, etc.

In addition to the above components, if necessary, the following other materials such as colored pigment, dye, surfactant, viscosity adjusting agent, etc. may be added to the ink composition of the present invention. The colored pigment may be selected from inorganic pigment, organic pigment, metal powder pigment, etc., the dye may be selected from azo group, anthraquinone group, phthalocyanine group, nitro group, carbonium group, perynone group, methine group, etc., the surfactant may be selected from anionic surfactants, nonionic surfactants, cationic surfactants, etc., and the viscosity adjusting agent may be selected from silica group, polyethylene oxide group, polymerized vegetable oil, etc.

The compound (A) which has at least one amide group (—CONH—) or amino group (—N<) and the compound (B) selected from phosphoric acid and phosphate compound which are added to the oil ink composition are used to enhance re-dispersibility of the pigment in the ink. That is, the precipitated pigment can be prevented from being hardly aggregated even when it is left for a long term, and thus the ink can be easily stirred by the ball which is built in the ink reservoir. Therefore, when the oil ink composition of the present invention is used for a writing instrument, homogeneous ink can be stably supplied, and thus stable lines can be drawn.

The ink composition of the present invention is manufactured by dispersing respective compounding ingredients with a pigment dispersing machine. As the pigment dispersing machine may be used a ball mill, a bead mill, a sand mill, a roll mill, a homomixer, dissolver bar, ultrasonic wave, etc., and the optimum one of these means is selected in accordance with the compounding ingredients of the ink composition. At this time, the compound (A) and the compound (B) may be added to the compounding ingredients separately from each other or after the compounds (A) and (B) are beforehand mixed with each other. Further, the compounds (A) and (B) may be mixed with each other before or after the other compounding ingredients are dispersed.

EMBODIMENTS

The present invention will be described in detail with preferred embodiments. However, the present invention is not limited to the following embodiments.

Embodiment 1

The compounding ingredients are adjusted to satisfy the following addition amount (weight %) with respect to the total amount of the ink composition:

titanium dioxide (produced by Teika Co., Ltd., trade name "JR-701"): 30 weight % alkyd resin (produced by Dainippon Ink & Chemicals, Inc., trade name "BECKOSOL P-470-70"): 9.0 weight % terpene phenol resin (produced by Yasuhara Yushi Kogyo Co., Ltd., trade name "YS POLYSTAR T-115"): 10.0 weight % xylene: 48.0 weight % diethyl amino ethyloleyl amide (compound A): 1.0 weight % polyphosphate (compound B) : 2.0 weight %

The ingredients of titanium dioxide, alkyd resin, terpene phenol resin, xylene, the compound A and the compound B are successively added to a vessel having a suitable size, and pre-mixed with each other for two hours by a stirrer. Thereafter, the mixture is homogeneously dispersed by a sand mill to obtain a white oil ink composition.

The obtained ink composition is filled in ink reservoirs each having balls of pens which are put on the market, and then these pens have been left at a room temperature under a still condition for one month. Thereafter, the pens filled with the ink composition are shaken by a hand, and the frequency of the shaking operation is counted until the stirring balls are moved. The result is shown in table 1.

Further, the obtained ink composition is filled in pens which are put on the market, and the ink composition is fully filled at the respective pen tops. The pens are put with their pen tops faced up while covered by caps, and they have been left at a room temperature for a week under a still condition. Thereafter, a writing test is performed on these pens. The writing test is performed by actually drawing lines on a transparent glass with these pens, and observing a line drawing state. The result is shown in the table 1. In the table 1, "O" represents a good line drawing state, "Δ" represents a bad line drawing state, and "x" represents that the line drawing is impossible.

TABLE 1

| | FREQUENCY (TIMES) | WRITING TEST RESULT |
|---|---|---|
| EMBODIMENT 1 | 4 | o |
| EMBODIMENT 2 | 5 | o |
| EMBODIMENT 2 | 5 | o |
| COMP. EXAMP. 1 | >100 | Δ |
| COMP. EXAMP. 2 | >100 | Δ |
| COMP. EXAMP. 3 | >100 | Δ |
| COMP. EXAMP. 4 | 10 | x |
| COMP. EXAMP. 5 | >100 | Δ |

Comparative Example 1

The white oil ink composition is obtained in the same manner as the embodiment 1 except that polyphosphate and diethyl amino ethyloleyl amide are not mixed into the ink composition of the embodiment 1, and xylene is added at a rate of 51 weight %. Further, the frequency of the stirring operation is counted in the same manner as the embodiment 1 until the stirring ball is moved. The result is shown in the table 1.

Embodiment 2

The compounding ingredients of this embodiment are adjusted to satisfy the following addition amount (weight %) with respect to the total amount of the ink composition:

titanium dioxide (produced by Du pont Japan, trade name "R-931"): 30.0 weight % alkyd resin (produced by Dainippon InK & Chemicals, Inc., trade name "BECKOSOL ODE-230-70"): 8.0 weight % rosin denatured maleic resin (produced by Arakawa Yushi Kogyo Co., Ltd., trade name "MALKYD 33"): 18.0 weight % xylene: 37.0 weight % isopropanol: 2.0 weight % stearyl amine (compound A): 2.0 weight % polyoxyethylene(4) lauryl ether phosphate (compound B): 2.0 weight % dye (produced by Mihara Chemicals Industries, Co., Ltd., trade mark "OIL YELLOW TOP): 1.0 weight %

The ingredients of titanium dioxide, alkyd resin, rosin denatured maleic resin, xylene, isopropanol, the compound A and the compound B are successively added to a vessel having a suitable size, and pre-mixed with each other for two hours by a stirrer. Thereafter, the mixture is homogeneously dispersed by a bead mill, added with dye and stirred and mixed by the stirrer to obtain a yellow oil ink composition. Like the embodiment 1, the frequency is counted until the stirring ball is moved. The result is shown in the table 1.

Embodiment 3

The compounds (A) and (B) and isopropanol of the ink composition of the embodiment 2 are beforehand stirred by the stirrer. These materials are added to the other ingredients which are homogeneously dispersed in the same manner as the embodiment 2, and then added with the dye and stirred by the stirrer to obtain a yellow oil ink composition. Like the embodiment 1, the frequency is counted until the stirring ball is moved. The result is shown in the table 1.

Comparative Example 2

The yellow oil ink composition is obtained in the same manner as the embodiment 2 except that stearyl amine, and polyoxyethylene(4) lauryl ether phosphate are not mixed in the compounding ingredients of the embodiment 2, and the addition amount of xylene is set to 41.0 weight % or more. Like the embodiment 1, the frequency is counted until the stirring ball is moved. The result is shown in the table 1.

Comparative Example 3

The yellow oil ink composition is obtained in the same manner as the embodiment 2 except that stearyl amine is added at a rate of 0.02 weight %, polyoxyethylene(4)lauryl ether phosphate is added at a rate of 0.02 weight %, and xylene is added at a rate of 40.96 weight %. The frequency is measured in the same manner as the embodiment 1 until the stirring ball is moved. The result is shown in the table 1.

Comparative Example 4

The yellow oil ink composition is obtained in the same manner as the embodiment 2 except that polyoxyethylene (4)lauryl ether phosphate is added at a rate of 17.0 weight %, and xylene is added at a rate of 22.0 weight %. The frequency is measured in the same manner as the embodiment 1 until the stirring ball is moved. The result is shown in the table 1.

Comparative Example 5

The yellow oil ink composition is obtained in the same manner as the embodiment 2 except that stearyl amine is not mixed and xylene is added at a rate of 39.0 weight %. The frequency is measured in the same manner as the embodiment 1 until the stirring ball is moved. The result is shown in the table 1.

What is claimed is:

1. Oil ink composition comprising titanium dioxide as pigment, resin, organic solvent, a compound (A) which has at least one amide group (—CONH—) or amino group (—N<) and a compound (B) selected from the group consisting of phosphoric acid, pyrophosphoric acid, metaphosphoric acid, polyphosphoric acid, lauryl phosphate, polyoxylpropylene oleyl ether phosphate, polyoxylethylene(4) lauryl ether phosphate, and dipolyoxyethylene nonylphenyl ether phosphate.

2. The oil ink composition as claimed in claim 1, wherein said compound (A) is added at a rate of 0.05 to 15 weight % of the total amount of the ink composition.

3. The oil ink composition as claimed in claim 1 or 2, wherein said compound (B) is added at a rate of 0.05 to 15 weight % of the total amount of the ink composition.

4. The oil ink composition as claimed in claim 1, wherein said compound (A) is diethyl amino ethyloleyl amide and is added at a rate of 1 weight % of the total amount of the ink composition, and said compound (B) is polyphosphate and is added at a rate of 2 weight % of the total amount of the ink composition.

5. The oil ink composition as claimed in claim 1, wherein said compound (A) is stearyl amine and is added at a rate of 2 weight % of the total amount of the ink composition, and said compound (B) is polyoxyethylene (4) lauryl ether phosphate and is added at a rate of 2 weight % of the total amount of the ink composition.

6. The oil ink composition as claimed in any one of claims 1 or 2, wherein said resin is alkyd resin, terpene phenol resin or rosin denatured maleic resin.

7. The oil ink composition as claimed in any one of claims 1 or 2, wherein said organic solvent is xylene or isopropanol.

8. The oil ink composition as claimed in any one of claims 1 or 2, wherein said oil ink composition is filled in a writing instrument comprising an ink reservoir having a stirring ball, and a pen top.

* * * * *